United States Patent
Chen

(10) Patent No.: US 9,543,828 B2
(45) Date of Patent: Jan. 10, 2017

(54) LOW-NOISE MULTI-OUTPUT POWER SUPPLY CIRCUIT AND CONTROL METHOD THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 495 days.

(21) Appl. No.: 14/066,888

(22) Filed: Oct. 30, 2013

(65) Prior Publication Data

US 2014/0139196 A1 May 22, 2014

(30) Foreign Application Priority Data

Nov. 16, 2012 (CN) .......................... 2012 1 0466966

(51) Int. Cl.
*H02J 3/00* (2006.01)
*H02M 3/156* (2006.01)
*H02M 1/00* (2006.01)

(52) U.S. Cl.
CPC ....... *H02M 3/156* (2013.01); *H02M 2001/008* (2013.01); *H02M 2001/0032* (2013.01); *Y02B 70/16* (2013.01)

(58) Field of Classification Search
USPC .......................................................... 307/82
See application file for complete search history.

(56) References Cited

U.S. PATENT DOCUMENTS

2011/0109363 A1* 5/2011 Chen ..................... H02M 3/156
327/178

* cited by examiner

*Primary Examiner* — Rexford Barnie
*Assistant Examiner* — Dru Parries
(74) *Attorney, Agent, or Firm* — Michael C. Stephens, Jr.

(57) ABSTRACT

Disclosed herein are low-noise multi-output power supply circuits and methods. In one embodiment, a method of controlling a low-noise multi-output power supply circuit, can include: (i) detecting operation states of each of a plurality of switch mode power supplies; (ii) generating a frequency modulation signal to control an operating frequency of a switch mode power supply to be substantially equal to a main frequency signal when the switch mode power supply is detected to operate in a heavy-load steady state; and (iii) controlling the operating frequency of the switch mode power supply to be independent of the main frequency signal when the switch mode power supply is detected to operate in a light-load or a dynamic state.

9 Claims, 8 Drawing Sheets

US 9,543,828 B2

LOW-NOISE MULTI-OUTPUT POWER SUPPLY CIRCUIT AND CONTROL METHOD THEREOF

RELATED APPLICATIONS

This application claims the benefit of Chinese Patent Application No. 201210466966.5, filed on Nov. 16, 2012, which is incorporated herein by reference in its entirety.

FIELD OF THE INVENTION

The present invention relates to the field of switch mode power supplies, and more specifically to low-noise multi-output power supply circuits and methods.

BACKGROUND

A multi-output switch mode power supply circuit can control operating frequencies of each switch mode power supply in the circuit. Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a method of controlling a low-noise multi-output power supply circuit, can include: (i) detecting operation states of each of a plurality of switch mode power supplies; (ii) generating a frequency modulation signal to control an operating frequency of a switch mode power supply to be substantially equal to a main frequency signal when the switch mode power supply is detected to operate in a heavy-load steady state; and (iii) controlling the operating frequency of the switch mode power supply to be independent of the main frequency signal when the switch mode power supply is detected to operate in a light-load or a dynamic state.

In one embodiment, a low-noise multi-output power supply circuit can include: (i) a plurality of switch mode power supplies; (ii) a plurality of detection circuits configured to detect operation states of each of the plurality of switch mode power supplies; (iii) a plurality of frequency modulation circuits configured to receive a main frequency signal, and to generate a plurality of frequency modulation signals corresponding to the plurality of switch mode power supplies; (iv) a frequency modulation signal being configured to control an operating frequency of a switch mode power supply to be substantially the same as the main frequency signal when the switch mode power supply is detected to operate in a heavy-load steady state; and (v) the frequency modulation signal being disallowed such that the operating frequency of the switch mode power supply is independent of the main frequency signal when the switch mode power supply is detected to operate in a light-load or a dynamic state.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
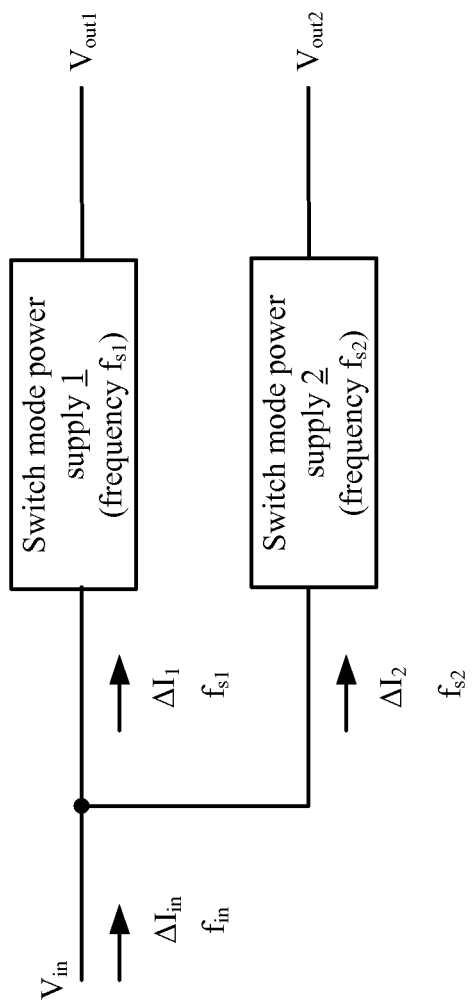
FIG. 1 is an example multi-output switch mode power supplies with independent frequencies.

A multi-output switch mode power supply circuit typically controls operating frequencies of each switch mode power supply to be independent from each other. As shown in FIG. 1, operating frequencies of switch mode power supplies 1 and 2 in the multi-output power supply circuit can separately be $f_{s1}$ and $f_{s2}$. Thus, each switch mode power supply can operate under given respective operating frequencies without interference. The maximum of the total input ripple of the entire circuit can be the sum of the maximum input ripple of each switch mode power supply circuit. As the frequency of the total ripple may change along with the frequency of each switch mode power supply circuit, frequency components, such as beat frequency may result. Thus, an electromagnetic compatibility (EMC) input filter may be utilized at the input of the switch mode power supplies, and may be relatively large, resulting in increased circuit area and production costs.

Figure 2:
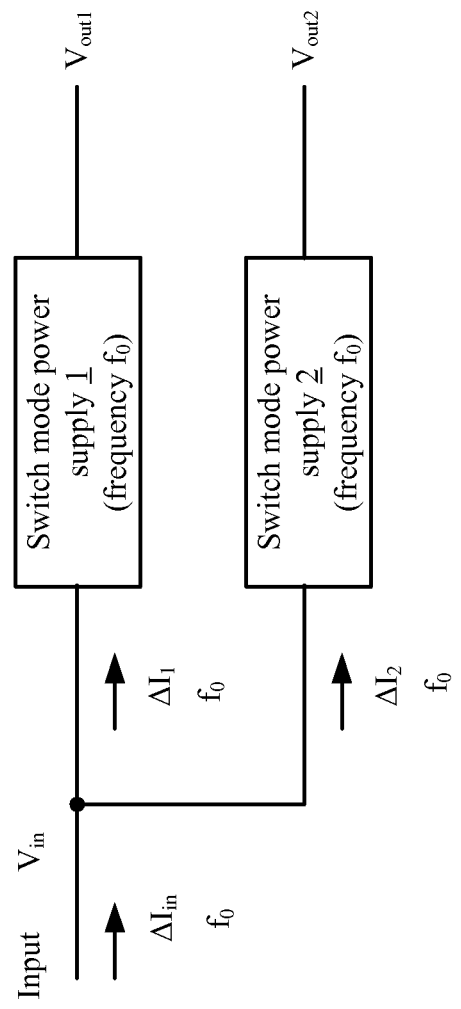
FIG. 2 is an example multi-output switch mode power supplies with fixed frequency control.

As shown in FIG. 2, in order to solve the beat frequency problem, a multi-output switch mode power supply with fixed frequency control can be utilized. A multi-output switch mode power supply with fixed frequency control can make all switch mode power supply circuits operate with a same clock. For example, switch mode power supplies 1 and 2 can operate at a main clock frequency $f_0$. Thus, the frequency of the total input ripple of the entire circuit can be identical to that of main clock frequency $f_0$ with no beat frequency, and the EMC input filter can be accordingly reduced in size. In addition, phase interleaving technology can be adopted to offset the input ripples of different switch mode power supplies to be zero when the switch mode power supplies operate at a heavy-load steady state, which can further reduce the amplitude of the total circuit ripple. However, by applying fixed frequency control, problems including low-efficiency and a worsened dynamic response can occur when switch mode power supplies operate in a light-load or dynamic state.

In one embodiment, a method of controlling a low-noise multi-output power supply circuit, can include: (i) detecting operation states of each of a plurality of switch mode power supplies; (ii) generating a frequency modulation signal to control an operating frequency of a switch mode power supply to be substantially equal to a main frequency signal when the switch mode power supply is detected to operate in a heavy-load steady state; and (iii) controlling the operating frequency of the switch mode power supply to be independent of the main frequency signal when the switch mode power supply is detected to operate in a light-load or a dynamic state.

As described herein, a plurality of switch mode power supplies can be controlled together (e.g., when each is detected as operating in a given operational state), or each can be controlled independent of the other switch mode power supplies. In some applications, detection and/or control circuitry can be shared such that all power supplies share the same control, while in other applications each switch mode power supply may have dedicated detection and/or control circuitry to allow for frequency control that is independent of the other power supplies. As an example of independent control, one switch mode power supply can be detected to operate in a heavy-load steady state (thus utilizing main frequency signal based control), while another switch mode power supply may be detected to operate in a light-load or a dynamic state (thus utilizing control that is independent of the main frequency signal). In this way, the switch mode power supplies can be controlled together or independently of the other power supplies. In much of the description herein, the power supplies are described as being controlled together, but independent power supply control is also supported in particular embodiments.

Figure 3:
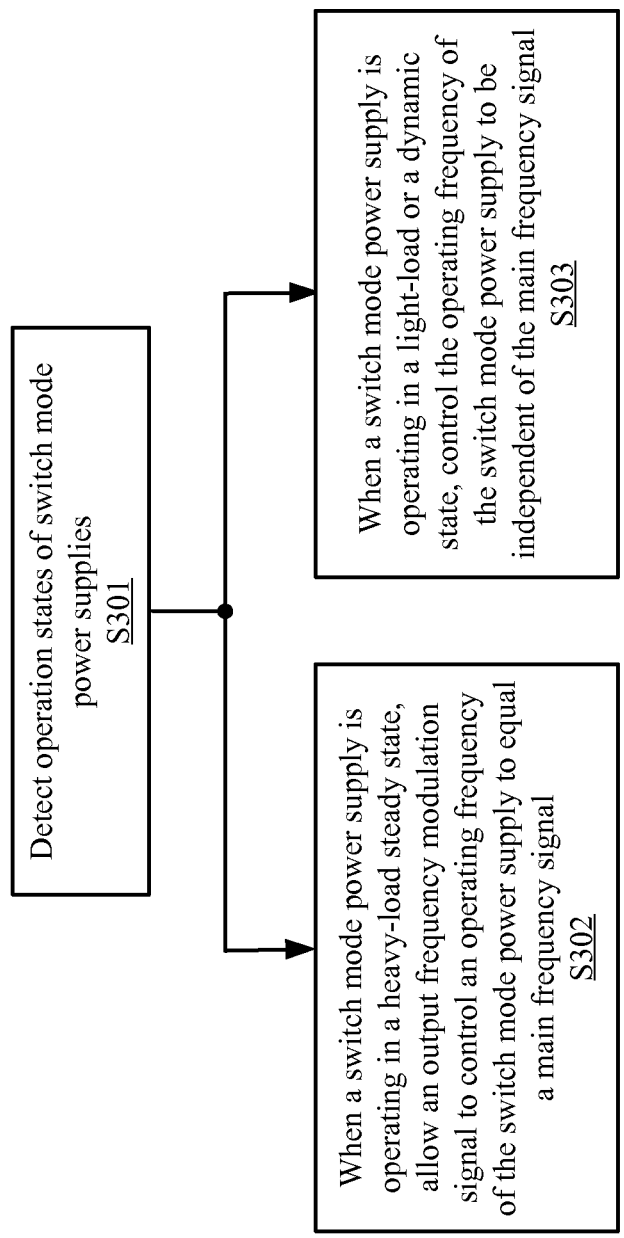
FIG. 3 is a flow diagram of an example control method for a multi-output power supply in accordance with embodiments of the present invention.

Referring now to FIG. 3, shown is an example control method for a low-noise multi-output power supply circuit, in accordance with embodiments of the present invention. In this example, at least two switch mode power supplies can be controlled. At S301, operation states of the switch mode power supplies can be detected (e.g., by using detection circuitry). At S302, when the switch mode power supplies operate in a heavy-load steady state, frequency modulation signals can be output to control operating frequencies of the switch mode power supplies to be identical to, or substantially the same as, the main frequency signal. For example, a heavy-load steady state can be predetermined load condition or amount of load on one or more of the switch mode power supplies.

At S303, when the switch mode power supplies operate in a light-load or a dynamic state, the operating frequencies of the switch mode power supplies can be controlled to be independent of, or different than, the main frequency signal. For example, a light-load operation state can be a load condition that is less than a predetermined amount on one or more of the switch mode power supplies. Also, a dynamic operation state can be a changing load (e.g., a varying load, a suddenly changing load, a temporary change in a load, and/or a load that changes between heavy and light conditions) on one or more of the switch mode power supplies. What constitutes a light-load, dynamic state, or a heavy-load steady state, can be predefined in certain applications. In particular embodiments, other definitions, combinations or types of load states, etc., can be defined or utilised, and as may be detected by various detection or other suitable circuitry. Thus, any predefined load or operation states of switch mode power supplies can be employed in particular embodiments to determine frequency-based control of the switch mode power supplies.

In one example, the control method can also include shifting the phase of the main frequency signal that is received by each switch mode power supply, and controlling each switch mode power supply to operate in an interleaved-phase state. This approach can minimize the total input ripple of all switch mode power supplies. In some cases, S302 can include controlling access switches to be turned on such that the switch mode power supplies receive the frequency modulation signals when the switch mode power supplies operate in a heavy-load steady state. S302 can also include controlling the access switches to be turned off such that the switch mode power supplies do not receive the frequency modulation signals when the switch mode power supplies operate in a light-load or a dynamic state.

In one embodiment, a low-noise multi-output power supply circuit can include: (i) a plurality of switch mode power supplies; (ii) a plurality of detection circuits configured to detect operation states of each of the plurality of switch mode power supplies; (iii) a plurality of frequency modulation circuits configured to receive a main frequency signal, and to generate a plurality of frequency modulation signals corresponding to the plurality of switch mode power supplies; (iv) a frequency modulation signal being configured to control an operating frequency of a switch mode power supply to be substantially the same as the main frequency signal when the switch mode power supply is detected to operate in a heavy-load steady state; and (v) the frequency modulation signal being disallowed such that the operating frequency of the switch mode power supply is independent of the main frequency signal when the switch mode power supply is detected to operate in a light-load or a dynamic state.

Figure 4:
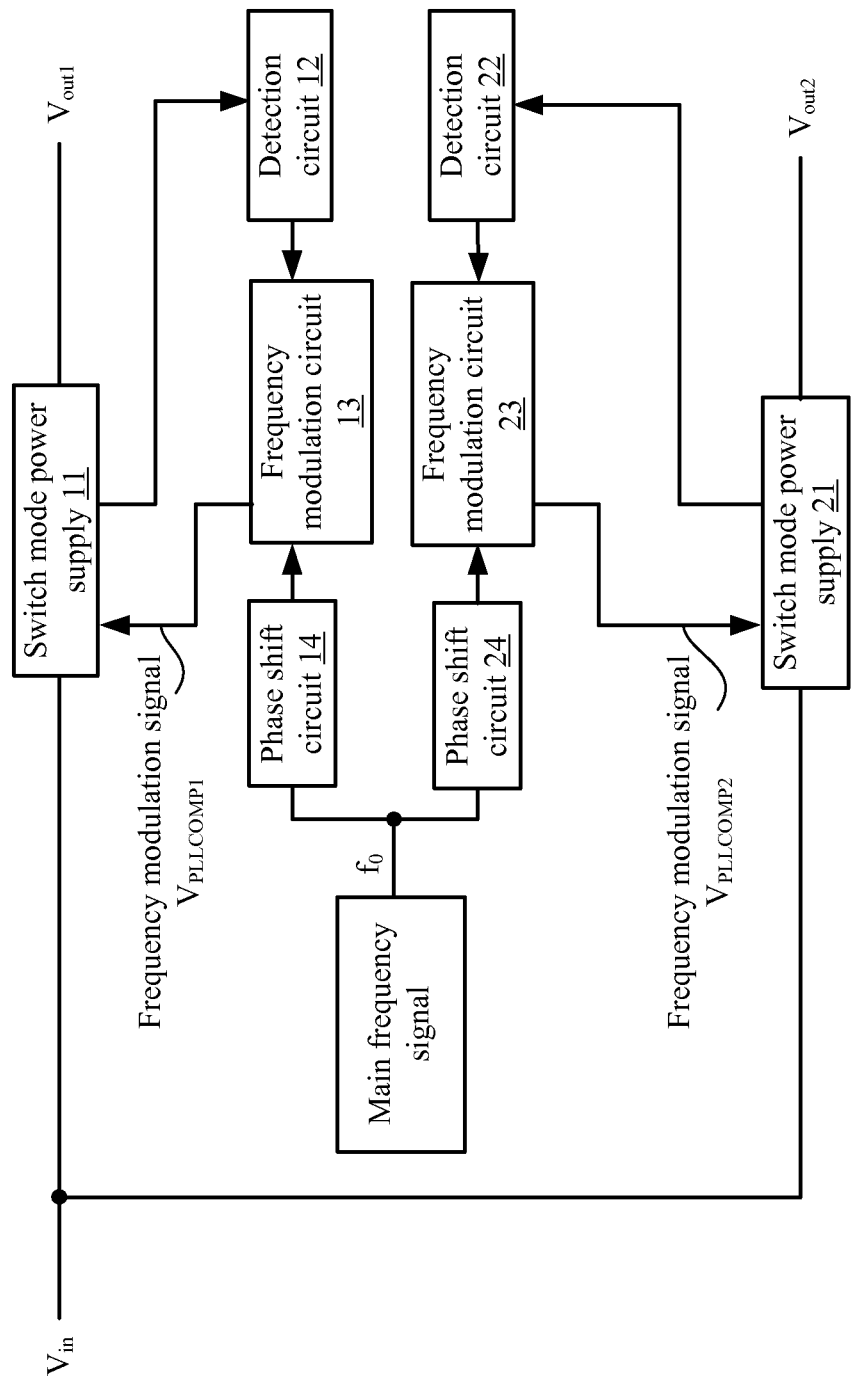
FIG. 4 is a diagram of an example low-noise multi-output power supply in accordance with embodiments of the present invention.

Referring now to FIG. 4, shown is a diagram of an example low-noise multi-output power supply in accordance with embodiments of the present invention. In this example, the low-noise multi-output power supply circuit including at least two switch mode power supplies, such as switch mode power supply 11 and switch mode power supply 21. Also, each switch mode power supply can include, or be associated with, a detection circuit and a frequency modulation circuit, in this particular example.

Detection circuit 12 (22) can connect to switch mode power supply 11 (21), and can be used to detect operation states of the corresponding switch mode power supply. Frequency modulation circuit 13 (23) can connect to detection circuit 12 (22), and to switch mode power supply 11 (21). When switch mode power supply 11 (21) operates in a heavy-load steady state, frequency modulation circuit 13 (23) may be enabled, and can receive main frequency signal $f_0$. Frequency modulation circuit 13 (23) can also a frequency modulation signal to control an operating frequency of corresponding switch mode power supply 11 (21) to be identical to, or substantially the same as, that of main frequency signal $f_0$. In this way, beat frequency can be avoided when the circuit is operating under the heavy-load steady state, circuit noise can be reduced.

When switch mode power supply 11 (21) operates in a light-load or a dynamic state, frequency modulation circuit 13 (23) may be disabled, and the operating frequency of switch mode power supply 11 (21) can be independent from main frequency signal $f_0$. In this way, switch mode power supplies 11 and 21 may operate at their optimal frequencies to ensure relatively high efficiency under light-load or fast dynamic response conditions. Thus, the switch mode power supplies can potentially respond quicker to dynamic or changing loads by having an operating frequency that is independent of the main frequency signal when such load conditions warrant.

For example, switch mode power supply 11 (21) can also include phase shift circuit 14 (24) that can connect to frequency modulation circuit 13 (23). Phase shift circuit 14 (24) can receive main frequency signal $f_0$. When detection circuit 12 (22) detects that switch mode power supply 11 (21) is operating in a heavy-load steady state, main frequency signal $f_0$ can be provided to frequency modulation circuit 13 (23) after the phase shift operation of phase shift circuit 14 (24). In this way, each switch mode power supply can be controlled to operate in an interleaved-phase state. Therefore, the total input ripple of the multi-output power supply circuit can be minimized, and circuit noise can be substantially reduced.

In particular embodiments, operating states of each switch mode power supply can be detected by detection circuit 12 (22). This can ensure that the operating frequency of each switch mode power supply can be allowed to change under different operating states. For example, at a heavy-load steady state, the operating frequency of each switch mode power supply can be substantially identical to main frequency signal $f_0$. Also, main frequency signal $f_0$ received by each switch mode power supply can be shifted (e.g., via phase shift circuitry 14/24), so as to minimize the total input ripple across the circuit. At light-load or dynamic operation states, each switch mode power supply may adopt non-fixed frequency control, independent of the main frequency signal. For example, each switch mode power supply can operate at their best or optimal frequency in order to achieve suitable efficiency under light-load operation states, or fast dynamic response times under dynamic (e.g., suddenly changing load) operation states.

Figure 5:
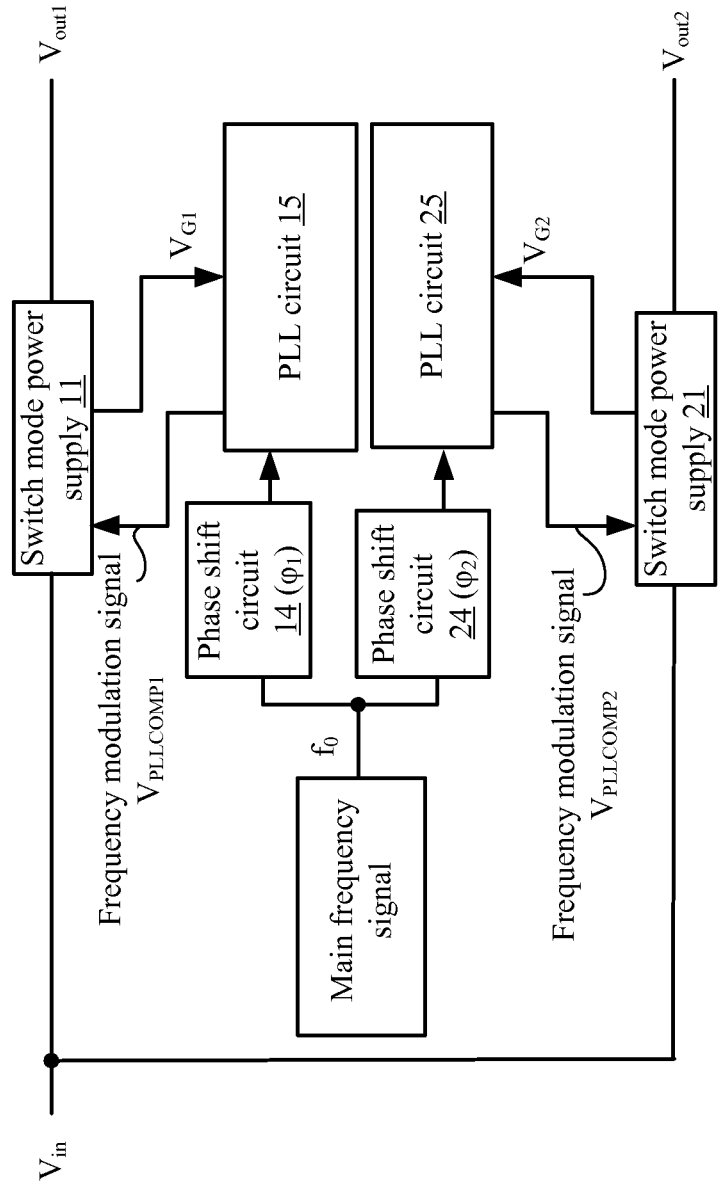
FIG. 5 is a diagram of an example low-noise multi-output power supply with a PLL in accordance with embodiments of the present invention.

Referring now to FIG. 5, shown is a diagram of an example low-noise multi-output power supply with a PLL in accordance with embodiments of the present invention. The main difference between this particular example and that discussed above is that frequency modulation circuit 13 (23) can be implemented utilizing phase-locked loop (PLL) circuit 15 (25). PLL circuit 15 (25) can connect to switch mode power supply 11 (21) and phase shift circuit 14 (24). PLL circuit 15 (25) can receive main frequency signal $f_0$ after being shifted (e.g., with phase angles of $\phi_1$ and $\phi_2$ as shown), and switch mode power supply driving signal $V_G$ (e.g., $V_{G1}$ and $V_{G2}$), and may output a frequency modulation signal to switch mode power supply 11 (21). For example, PLL circuit 15 can output frequency modulation signal $V_{PLLCOMP1}$ to switch mode power supply 11, and PLL circuit 25 can output frequency modulation signal $V_{PLLCOMP2}$ to switch mode power supply 21.

By utilizing PLL circuit 15 (25) in frequency modulation circuit 13 (23), the operating state of switch mode power supply 11 (21) may not need to be detected by detection circuit 12 (22) due to the automatic operation of switch mode power supply 11 (21) based on the operation principle of PLL circuit 15 (25). In other words, PLL circuit 15 (25) can achieve the corresponding function of detection circuit 12 (22).

PLL circuit 15 (25) can be used to limit the phase locking frequency range of the input signal to be in a range of minimum frequency $f_{min}$ and maximum frequency $f_{max}$. When switch mode power supply 11 (21) operates in a heavy-load steady state, the operating frequency can be between minimum frequency $f_{min}$ and maximum frequency $f_{max}$, and PLL circuit 15 (25) may be enabled. This can fix the operating frequency of switch mode power supplies 11 (21) at main frequency signal $f_0$. Further, due to phase shift circuit 14 (24), in addition to the frequency of the total input ripple of the circuit being equal to main frequency signal $f_0$, each switch mode power supply may operate in an interleaved-phase state. Thus, their input ripples can offset the amplitude of the total input ripple to a certain extent, and may result in reduction of the input EMC filter circuit in particular embodiments.

When switch mode power supply 11 (21) operates in a light-load state, the operating frequency of the switch mode power supply can be lower than minimum frequency $f_{min}$. PLL circuit 15 (25) may be disabled as a result, so the operating frequency of switch mode power supply circuit 11 (21) can be independent of main frequency signal $f_0$. Thus, switch mode power supply circuit 11 (21) can operate under a best or optimal frequency for that particular supply circuit and load condition, so as to reduce switching losses and improve efficiency under the light-load state.

During a dynamic load condition of switch mode power supply 11 (21), such as when a load changes suddenly, the switching frequency can be increased or decreased instantly due to the loop response. Thus, the loop response of PLL circuit 15 (25) can be designed to be relatively slow. An operating frequency of switch mode power supply 11 (21) can be independent from main frequency signal $f_0$, but can be a best or other suitable frequency to achieve the best or a suitable dynamic response for the given load conditions. After a dynamic response, the operating frequency of switch mode power supplies 11 (21) can recover to between minimum frequency $f_{min}$ and maximum frequency $f_{max}$, and the operating frequency of switch power mode supply 11 (21) can be locked at main frequency signal $f_0$ by PLL circuit 15 (25) to reduce the switch ripple under steady state conditions.

Figure 6:
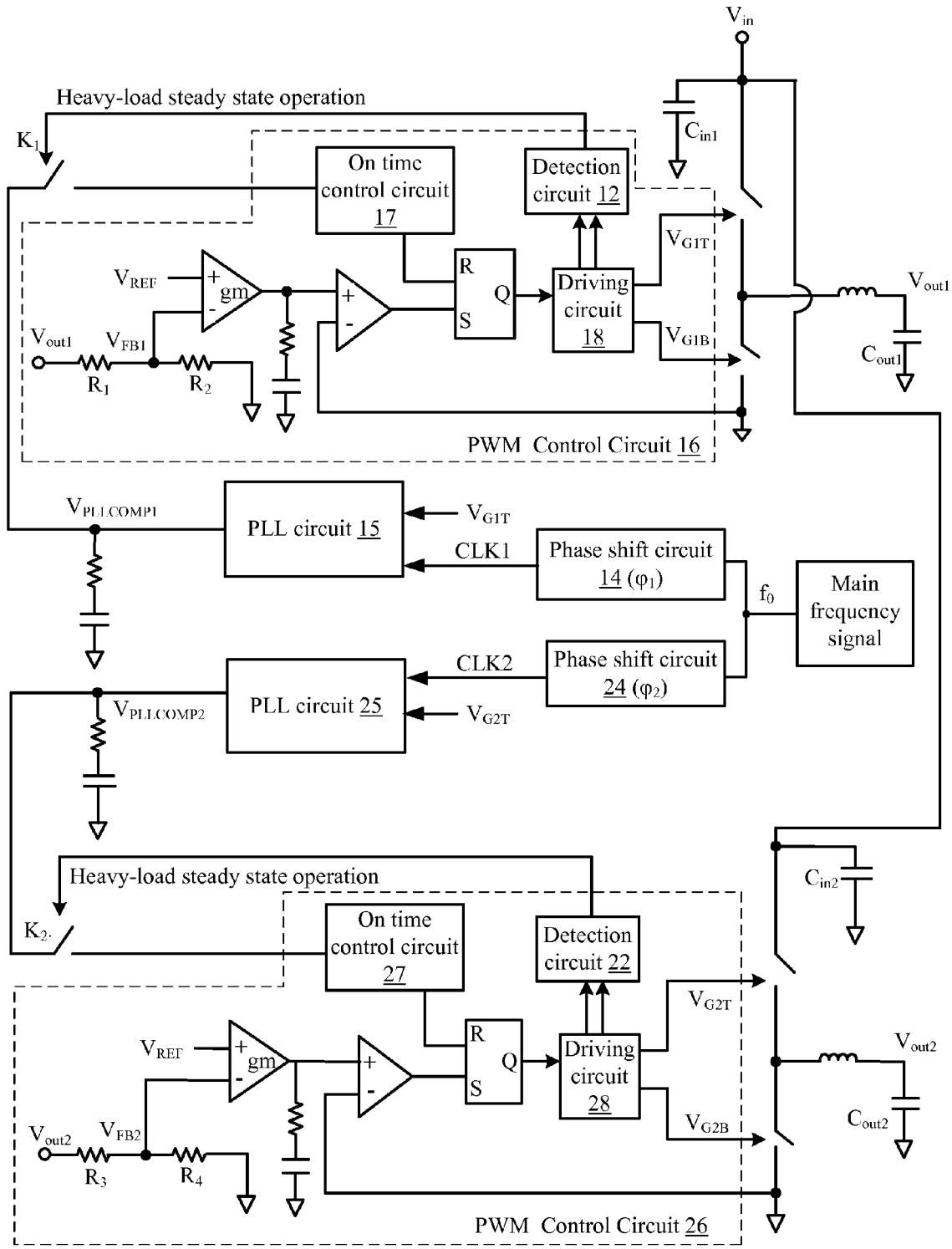
FIG. 6 is a diagram of an example power supply circuit with on time control, in accordance with embodiments of the present invention.

Referring now to FIG. 6, shown is a diagram of an example power supply circuit with on time control, in accordance with embodiments of the present invention. In this example, a main circuit topology of switch mode power supply 11 (21), and a specific implementation of the control circuit, are shown. Also, while a two-output switch mode power supply is shown to illustrate the operating procedure of the multi-output power supply circuit, more than two switch mode power supply outputs can also be supported in particular embodiments. Switch mode power supply 11 (21) can also include access switch $K_1$ ($K_2$) that can connect between an output terminal of PLL circuit 15 (25) and switch mode power supply 11 (21).

Frequency modulation circuit 13 can include PLL circuit 15 that can receive reference clock signal CLK1 shifted by phase shift circuit 14, and the phase angle can, e.g., be $\phi_1=0°$. Correspondingly, reference clock signal CLK2 can be generated by phase shift circuit 24 of the other switch mode power supply, and the phase angle can, e.g., be $\phi_2=180°$. When detection circuit 12 (22) detects that switch mode power supply 11 (21) is operating at a light-load or a dynamic state, access switch $K_1$ ($K_2$) can be turned off. In this situation, the operating frequency of the switch mode power supply can be independent from main frequency signal $f_0$. The switch mode power supply can operate at a suitable frequency to obtain low power consumption, and improve efficiency under the light-load state, or obtain a fastest dynamic response under the dynamic state. In this way, the on time control circuit can control switch mode power supply 11 (21) to operate at constant on time mode.

When detection circuit 12 (22) detects that switch mode power supply 11 (21) is operating in a heavy-load steady state, PLL circuit 15 (25) can compare switch mode power supply driving signal $V_{G1T}$ ($V_{G2T}$) against reference clock signal CLK1 (CLK2), and the output signal can pass through the compensation circuit (e.g., including a series connected resistor and capacitor) and can be converted to frequency modulation signal $V_{PLLCOMP1}$ ($V_{PLLCOMP2}$). Access switch $K_1$ ($K_2$) can be turned on to allow switch mode power supply 11 (21) to receive frequency modulation signal $V_{PLLCOMP1}$ ($V_{PLLCOMP2}$). When access switch $K_1$ ($K_2$) is on, frequency modulation signal $V_{PLLCOMP1}$ ($V_{PLLCOMP2}$) can be provided to on time control circuit 17 (27).

By regulating the on time of the main switch in switch mode power supply 11 (21), the operating frequency of switch mode power supply 11 (21) can be the same as main frequency signal $f_0$. This can ensure that the phase of the main switch in switch mode power supply 11 (21) can be the same as the corresponding reference clock signal (CLK1 or CLK2). Because there may be a 180° phase difference between reference clock signals CLK1 and CLK2, there can also be a 180° phase difference between operation of switch mode power supplies 11 and 21, in order to minimize the total input ripple.

One skilled in the art will recognize that other topologies of the switch mode power supplies, as well as control method variations, and extended outputs of the multiple-output power supply circuit, can be supported in particular embodiments. The following examples can be used to further explain the regulating process based on the operating frequency and control of the switch mode power supplies through frequency modulation circuits under various control modes.

Figure 7:
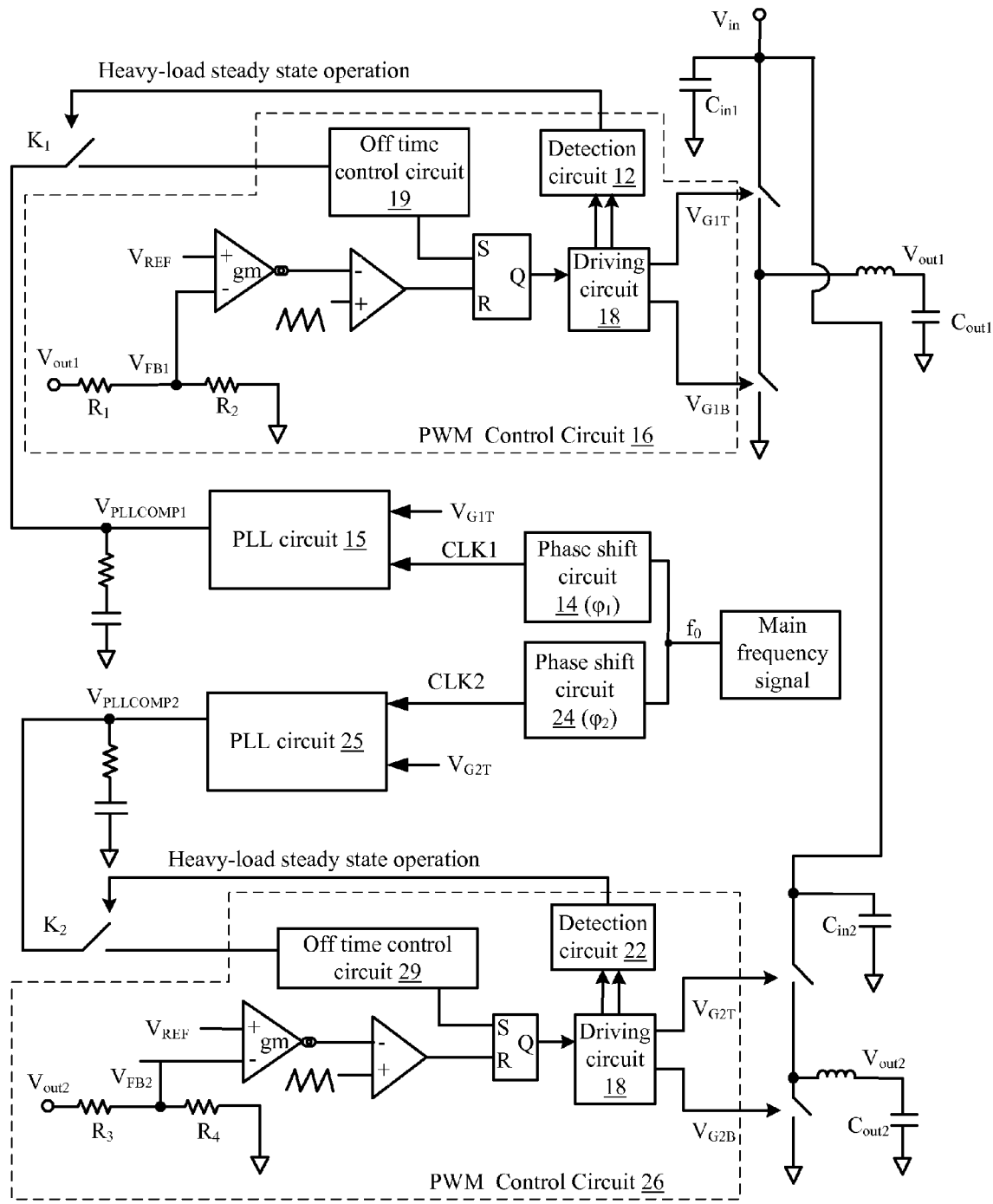
FIG. 7 is a diagram of an example power supply circuit with off time control, in accordance with embodiments of the present invention.

Referring now to FIG. 7, shown is a diagram of an example power supply circuit with off time control, in accordance with embodiments of the present invention. Thus, in this case, the control strategy of switch mode power supply 11 (21) can be off time control. When detection circuit 12 (22) detects that switch mode power supply 11 (21) is operating at a light-load or a dynamic state, access switch $K_1$ ($K_2$) can be turned off. In this situation, the operating frequency of switch mode power supply 11 (21) can be independent of main frequency signal $f_0$, and may operate at a suitable frequency to obtain low power, and improved efficiency under the light-load state, or fast dynamic response. The off time control circuit can control switch mode power supply 11 (21) to operate in a constant off time mode.

When detection circuit 12 (22) detects that switch mode power supply 11 (21) is operating in a heavy-load steady state, PLL circuit 15 (25) can compare switch mode power supply driving signal $V_{G1T}$ ($V_{G2T}$) against reference clock signal CLK1 (CLK2), and the output signal can pass through the compensation circuit (e.g., including a series connected resistor and capacitor) and can be converted to frequency modulation signal $V_{PLLCOMP1}$ ($V_{PLLCOMP2}$). Access switch $K_1$ ($K_2$) can be turned on to control the switch mode power supplies to receive frequency modulation signal $V_{PLLCOMP1}$ ($V_{PLLCOMP2}$). When access switch $K_1$ ($K_2$) is on, frequency modulation signal $V_{PLLCOMP1}$ ($V_{PLLCOMP2}$) can be provided to off time control circuit 19 (29).

By regulating the off time of a main switch in the switch mode power supplies, the operating frequency of switch mode power supply 11 (21) can be identical to, or substantially the same as, main frequency signal $f_0$. This can ensure the phase of the main switch in switch mode power supply 11 (21) can be the same as that of corresponding reference clock signal CLK1 or CLK2. In one example, because there may be a 180° phase difference between reference clock signals CLK1 and CLK2, there can also be a 180° phase difference between two switch mode power supplies, in order to minimize the total input ripple.

Figure 8:
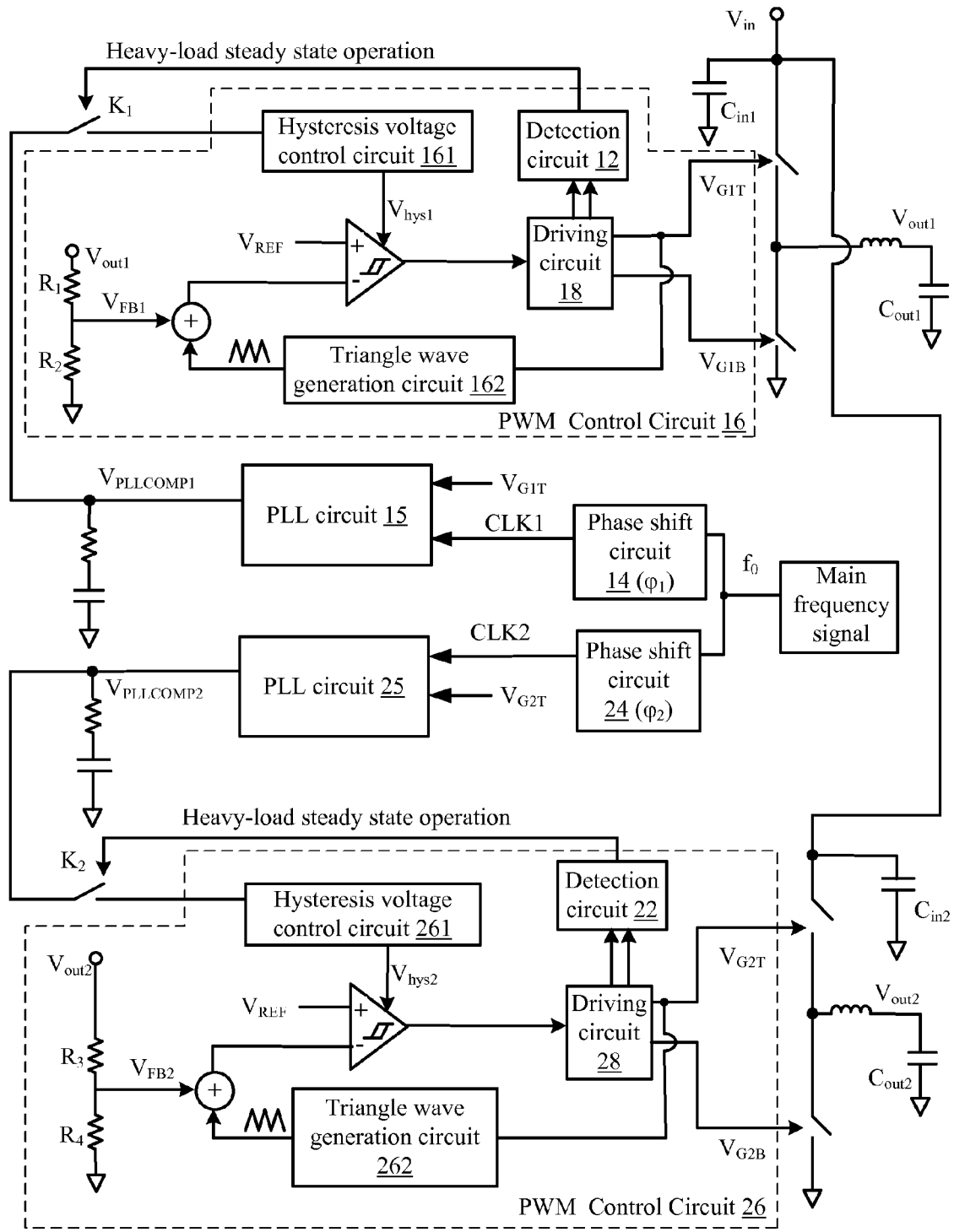
FIG. 8 is a diagram of an example power supply circuit with hysteretic control, in accordance with embodiments of the present invention.

Referring now to FIG. 8, shown is a diagram of an example power supply circuit with hysteretic control, in accordance with embodiments of the present invention. In this example of hysteresis control, feedback signal $V_{FB1}$ obtained by output voltage $V_{out1}$ through a resistor divider can be summed with a triangle wave signal (e.g., from triangle wave generation circuit 162/262) that may have a same phase as the driving signal of the main switch. The output of the summation circuit can be compared against reference voltage $V_{REF}$, to control operation of the main switch according to the comparison result. Thus, hysteresis voltage $V_{hys1}$ of the hysteresis comparator can affect the operating frequency of switch mode power supply 11. Similarly, hysteresis voltage $V_{hys2}$ of the hysteresis comparator can affect the operating frequency of switch mode power supply 21.

When detection circuit 12 (22) detects that switch mode power supply 11 (21) is operating at a light-load or a dynamic state, access switch $K_1$ ($K_2$) can be turned off. In this case, the operating frequency of switch mode power supply 11 (21) can be independent of main frequency signal $f_0$, and may operate at a best or suitable frequency to obtain low power, improved efficiency under a light-load state, or a relatively fast dynamic response to meet the needs of a dynamic load, depending upon the operation state or load condition detected.

When detection circuit 12 (22) detects that switch mode power supply 11 (21) is operating at a heavy-load steady state, PLL circuit 15 (25) can compare switch mode power supply driving signal $V_{G1T}$ ($V_{G2T}$) against reference clock signal CLK1 (CLK2), and the output signal can pass through a compensation circuit (e.g., including a series connected resistor and capacitor) and can be converted to frequency modulation signal $V_{PLLCOMP1}$ ($V_{PLLCOMP2}$). In this situation, access switch $K_1$ ($K_2$) can be turned on to control the switch mode power supplies to receive frequency modulation signal $V_{PLLCOMP1}$ ($V_{PLLCOMP2}$).

Frequency modulation signal $V_{PLLCOMP1}$ ($V_{PLLCOMP2}$) can be provided to hysteresis voltage control circuit 161 (261) when access switch $K_1$ ($K_2$) is on. By regulating hysteresis voltage $V_{hys1}$ ($V_{hys1}$) of the hysteresis voltage control circuit, the operating frequency of switch mode power supply 11 (21) can be identical to, or substantially the same as, main frequency signal $f_0$. This can ensure the phase of the main switch in switch mode power supply 11 (21) can be the same as the corresponding reference clock signal. Because there may be a 180° phase difference between reference clock signals CLK1 and CLK2, there can also be a 180° phase difference between the operating control signals of two switch mode power supplies, in order to minimize the total input ripple. Of course, other phase angle differences (e.g., 120° for three-output power supply circuits) can also be supported in particular embodiments.

In this way, PLL circuitry can be combined with different control schemes. For example, switch mode power supplies can include constant on time control circuits (see, e.g., FIG. 6), constant off time control circuits (see, e.g., FIG. 7), and/or hysteresis voltage control circuits (see, e.g., FIG. 8). Further, particular embodiments may be applied in multiple-output power supplies, such as more than two outputs, and other control circuit implementations can also be accommodated.

In summary, when detection circuits detect that the operation states of switch mode power supplies are at a heavy-load steady state, the main frequency signal can be received by frequency modulation circuits, and then frequency modulation signals can be provided to switch mode power supplies. This can control the operating frequencies of the switch mode power supplies to be identical to the main frequency signal. When detection circuits detect that switch mode power supplies are operating at a light-load state or a dynamic state, switch mode power supplies may operate at their best individual supply frequency, as opposed to being tied to the main frequency signal. In this way, each switch mode power supply can avoid beat frequency under a heavy-load steady state, and may reduce overall circuit noise.

Also, when all switch mode power supplies are operating at a light-load state or a dynamic state, independent frequency control can provide for relatively power consumption, improved efficiency under a light-load state, and fast dynamic response. In addition, when detection circuits detect that switch mode power supplies are operating at a heavy-load steady state, the main frequency signal can be provided to frequency modulation circuits after being shifted by the phase shift circuits. This interleaved-phase state approach can minimize the total input ripple of the multiple-output power supply circuit, and reduce overall circuit noise.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of controlling a low-noise multi-output power supply circuit, the method comprising:
    a) detecting operation states of each of a plurality of switch mode power supplies;
    b) generating a frequency modulation signal to control an operating frequency of a switch mode power supply to be substantially equal to a main frequency signal when said switch mode power supply is detected to operate in a heavy-load steady state;
    c) controlling said operating frequency of said switch mode power supply to be independent of said main frequency signal when said switch mode power supply is detected to operate in a light-load or a dynamic state;
    d) shifting a phase of said main frequency signal; and
    e) controlling each of said plurality of switch mode power supplies to operate in an interleaved-phase state.

2. The method of claim 1, wherein said generating and said controlling steps are performed for each of said plurality of switch mode power supplies.

3. The method of claim 1, further comprising:
    a) controlling an access switch to be turned on, and said switch mode power supply to receive said frequency modulation signal, when said switch mode power supply is detected to operate in said heavy-load steady state; and
    b) controlling said access switch to be turned off such that said switch mode power supply does not receive said frequency modulation signal when said switch mode power supply is detected to operate in said light-load or said dynamic state.

4. A low-noise multi-output power supply circuit, comprising:
    a) a plurality of switch mode power supplies;
    b) a plurality of detection circuits configured to detect operation states of each of said plurality of switch mode power supplies;
    c) a plurality of frequency modulation circuits configured to receive a main frequency signal, and to generate a plurality of frequency modulation signals corresponding to said plurality of switch mode power supplies, wherein said plurality of switch mode power supplies comprises a plurality of phase shift circuits configured to receive said main frequency signal, and to generate a phase shifted output to said plurality of frequency modulation circuits to control each of said plurality of switch mode power supplies to operate in an interleaved-phase state;
    d) a frequency modulation signal being configured to control an operating frequency of a switch mode power supply to be substantially the same as said main frequency signal when said switch mode power supply is detected to operate in a heavy-load steady state; and
    e) said frequency modulation signal being disallowed such that said operating frequency of said switch mode power supply is independent of said main frequency signal when said switch mode power supply is detected to operate in a light-load or a dynamic state.

5. The power supply circuit of claim 4, wherein said plurality of frequency modulation circuits comprises a plurality of phase-locked loop circuits configured to receive said main frequency signal, and to output said plurality of frequency modulation signals.

6. The power supply circuit of claim 4, wherein each of said switch mode power supplies further comprises:
    a) an access switch coupled between said frequency modulation signal and said switch mode power supply; and
    b) said access switch being controllable by a detection circuit to be turned on to allow said switch mode power supply to receive said frequency modulation signal when said switch mode power supply is detected to operate in said heavy-load steady state.

7. The power supply circuit of claim 4, wherein:
    a) said switch mode power supply is configured to operate in a constant conduction time mode when said switch mode power supply is detected to operate in said light-load or said dynamic state; and
    b) said frequency modulation signal is configured to regulate conduction times of said switch mode power supply to control said operating frequency to be substantially the same as said main frequency signal when said switch mode power supply is detected to operate in said heavy-load steady state.

8. The power supply circuit of claim 4, wherein:
a) said switch mode power supply is configured to operate in a constant off time mode when said switch mode power supply is detected to operate in said light-load or said dynamic state; and
b) said frequency modulation signal is configured to regulate an off time of said switch mode power supply to control said operating frequency to be substantially the same as said main frequency signal when said switch mode power supply is detected to operate in said heavy-load steady state.

9. The power supply circuit of claim 4, wherein:
a) said switch mode power supply is configured to operate in a hysteretic control mode when said switch mode power supply is detected to operate in said light-load or said dynamic state; and
b) said frequency modulation signal is configured to regulate a hysteresis voltage of a hysteresis comparator to control said operating frequency to be substantially the same as said main frequency signal when said switch mode power supply is detected operate in said heavy-load steady state.

\* \* \* \* \*